(12) United States Patent
Olson et al.

(10) Patent No.: US 6,564,157 B2
(45) Date of Patent: May 13, 2003

(54) ON-LINE DEVICE FOR PREDICTING AT LEAST ONE FLUID FLOW PARAMETER IN A PROCESS

(75) Inventors: David A. Olson, London (CA); Yuri Lawryshyn, Komoka (CA); Harold Wright, London (CA)

(73) Assignee: Trojan Technologies, Inc. (CA)

( * ) Notice: Subject to any disclaimer, the term of this patent is extended or adjusted under 35 U.S.C. 154(b) by 82 days.

(21) Appl. No.: 09/729,921

(22) Filed: Dec. 6, 2000

(65) Prior Publication Data

US 2002/0103608 A1 Aug. 1, 2002

Related U.S. Application Data

(60) Provisional application No. 60/218,177, filed on Jul. 14, 2000, and provisional application No. 60/168,737, filed on Dec. 6, 1999.

(51) Int. Cl.⁷ .............................. G01F 1/00; G06F 19/00
(52) U.S. Cl. ............................................ 702/45; 702/50
(58) Field of Search .............................. 702/28–32, 45, 702/49–50, 100; 250/363.4, 365, 372–374; 700/31–33, 281

(56) References Cited

U.S. PATENT DOCUMENTS

| | | | |
|---|---|---|---|
| 5,065,336 A | * 11/1991 | Buchelli | .................... 702/30 |
| 5,572,993 A | 11/1996 | Kurome et al. | |
| 5,590,390 A | 12/1996 | Maarschalkerweerd | |
| 5,717,215 A | * 2/1998 | Inushima et al. | ........... 250/372 |
| 5,740,033 A | * 4/1998 | Wassick et al. | ............... 700/29 |

OTHER PUBLICATIONS

"Interactive Time–Dependent Particle Tracing Using Tetrahedral Decomposition", N Visualization And Computer Graphics, vol. 2, No. 2, David N. Kenwright and David A. Lane, Jun. 1996 (pp. 120–129).

* cited by examiner

*Primary Examiner*—Bryan Bui
(74) *Attorney, Agent, or Firm*—Katten Muchin Zavis Rosenman

(57) ABSTRACT

An on-line device for predicting at least one fluid flow parameter in a process includes structure and/or function whereby a flow domain has disposed therein a predetermined portion in which a fluid flows. Preferably, the device includes a computer having: (i) a memory for receiving a database, the database including relative information in respect of a plurality of nodes or a plurality of particle pathways in the pre-determined portion; (ii) structure to receive input data from the process, and (iii) structure to calculate the at least one fluid flow parameter from the database and the input data. The device is particularly advantageously employed as a UV dosimeter.

87 Claims, No Drawings

ON-LINE DEVICE FOR PREDICTING AT LEAST ONE FLUID FLOW PARAMETER IN A PROCESS

BACKGROUND OF THE INVENTION

1. Field of the Invention

In one of its aspects, the present invention relates to an on-line device for predicting at least one fluid flow parameter in a process. In another of its aspects, the present invention relates to an on-line UV dosimeter for predicting bioassay equivalent does for a given microorganism in a UV disinfection process. In yet another of its aspects, the present invention relates to a method for on-line prediction of at least one fluid flow parameter in a process.

2. Description of the Prior Art

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

U.S. Pat. Nos. 5,418,370, 5,539,210 and 5,590,390 (all in the name of Maarschalkerweerd and all assigned to the assignee of the present invention and hereinafter referred to as the Maarschalkerweerd #2 Patents) all describe fluid treatment systems which employ UV radiation. More specifically, the Maarschalkerweerd #2 Patents teach an ultraviolet radiation treatment system disposed in an open channel comprising a gravity fed flow of fluid. In a preferred embodiment, after treatment, the fluid is then discharged into a stream, creek, river, lake or other body of water—i.e., this embodiment represent application of the system in a municipal wastewater treatment facility.

Conventionally, in the art of UV radiation treatment systems, the radiation dose in a given irradiation zone has been calculated using the equation:

$$DOSE = t_{ave} \times I_{ave}$$

wherein $t_{ave}$ is the average time that a microbe spends in the irradiation zone and $I_{ave}$ is average UV intensity integrated over the volume in the irradiation zone.

Recently, it has been suggested that this relatively simple calculation can, in certain cases, lead to inaccuracies in the dose which is actually delivered to the fluid being treated—see "Hydrodynamic behaviour in open-channel UV systems: Effects on microbial inactivation" (K. Chiu, D. A. Lyn, and E. R. Blatchley III, CSCE/ASCE Environmental Engineering Conference (1997), pages 1189–1199). This can have significant consequences since many UV radiation treatment systems are specified in large part using such a calculation. Further, the calculation presumes that the system is operating in an optimum state at all times and thus, for example, would not take into account a situation where one or more of the UV radiation sources is not operating properly or at all.

Accordingly, there remains a need in the art for a device which would allow one to predict with improved accuracy the dose delivered to the flow of fluid. It would be advantageous if such a device had widespread use beyond that in predicting (lose delivered to a flow of fluid in a UV radiation treatment system—i.e., beyond use as a dosimeter.

SUMMARY OF THE INVENTION

It is an object of the present invention to obviate or mitigate at least one of the above-mention disadvantages of the prior art.

It is another object of the present invention to provide a novel on-line device for predicting at least one fluid flow parameter in a process.

It is another object of the present invention to provide a novel method for on-line prediction of at least one fluid flow parameter in a process.

In one of its aspects, the present invention provides an on-line device for predicting at least one fluid flow parameter in a process, the process comprising a bounded flow domain having disposed therein a pre-determined matrix, the device comprising a computer having:

(i) a memory for receiving a database, the database comprising location information for a plurality of nodes or particle pathways in the matrix, (ii) means to receive input data from the process, and (iii) means to calculate the at least one fluid flow parameter from the database and the input data.

In another of its aspects, the present invention provides an on-line device for predicting at least one fluid flow parameter in a process, the process comprising a flow domain having disposed therein a pre-determined portion in which a fluid flows, the device comprising a computer having:

(i) a memory for receiving a database, the database comprising relative information in respect of a plurality of nodes or a plurality of particle pathways in the pre-determined portion;

(ii) means to receive input data from the process, and (iii) means to calculate the at least one fluid flow parameter from the database and the input data.

In yet another of its aspects, an on-line UV dosimeter device for predicting bioassay equivalent dose for a given microorganism in a UV disinfection process, the UV disinfection process comprising a flow domain in which a fluid flows, the device comprising a computer having:

(i) a memory for receiving a database, the database comprising relative dose information in respect of a plurality of fluid pathways through the flow domain;

(ii) means to receive input data from the process, the input data selected from the group comprising UV transmittance of the fluid, flow rate of the fluid and intensity field in the fluid domain; and (iii) means to calculate the bioassay equivalent dose for the given microorganism from the database and the input data.

In yet another of its aspects, the present invention provides a method for on-line prediction of at least one fluid flow parameter in a process, the process comprising a flow domain having disposed therein a pre-determined portion in which a fluid flows, the method comprising the steps of:

(i) storing in a memory of a computer a database, the database comprising relative information in respect of a plurality of nodes or a plurality of particle pathways in the pre-determined portion;

(ii) obtaining input data from the process;

(iii) conveying the input data to the computer; and (iv) calculating the at least one fluid flow parameter from the database and the input data.

A fundamental understanding of a chemical, photochemical or biological process is key to predicting and controlling the process' outcomes. Most of these types of processes involve fluid flow, and the behaviour of the fluid can significantly affect the efficiency of the process. The better the understanding of the fluid flow, the better the process prediction and control.

An advantage of the present invention is an online prediction of at least one fluid flow parameter such as velocity, pressure, temperature and turbulence parameters calculated preferably by computational fluid dynamics (CFD) and coupled with certain relevant parameters measured online at discrete points in the process of interest. If all of the relevant flow parameters are known throughout the flow domain of interest, a much better prediction of system response can be achieved, which leads to better process control.

For example, the invention can be applied to predicting dose distribution profiles in a UV radiation fluid treatment system thereby mitigating and/or obviating the above-mentioned disadvantages of the prior art. Of course, those of skill in the art will recognize that the present invention may be used in a variety of other applications such as photochemical processes, chemical processes, biological processes and the like.

DETAILED DESCRIPTION OF THE PREFERRED EMBODIMENTS

The present device comprises a computer. The computer includes a memory for receiving a database.

The database comprises location information for a plurality of nodes in the matrix. The database may be obtained by determining the distribution of flows parameters within a flow domain (e.g., a channel or pipe for containing a fluid in the process of interest). This can be achieved on-line or off-line.

If the database is obtained off-line, there are two general techniques which may be used. The first comprises "direct measurement" using techniques such as Laser Doppler Anemometry, Hot Wire Anemometry and Particle Image Velocimetry. The second comprises "numerical/computational techniques", typically referred to as CFD (Computational Fluid Dynamics)—see, for example, "An introduction to Computational Fluid Dynamics" by Versteeg et al. (1995).

If the database is obtained on-line, it is preferred to use numerical/computational techniques. More detail on these techniques maybe obtained from one or more of:

1. "Hot Wire Anemometry", G. Compte-Bellot, Annu.Rev.Fluid Mech., vol.8, pp.209–231 (1976);
2. "Laser Velocimetry", Ronald J. Adrian, Chapter 5 in "Fluid Mechanics Measurements", Edited by Richard J. Goldstein, 1983;
3. "Digital Particle Image Velocimetry", C. E. Willert and M. (harib, Experiments in Fluids 10, 181–193 (1991);
4. TSI Inc. at the website: "http://www.tsi.com/";
5. DANTEC Measurement Technology at the website: "http ://www.dantecmt.com/";
6. Fluent5 Users Guide. Fluent Incorporated, Lebanon, N.H., USA; and
7. Versteeg, H. K. and W. Malalasekera. An Introduction to Computational Fluid Dynamics. Longman Group Ltd., 1995.

In the preferred application of the present invention (i.e., a UV dosimeter), the database which is stored in the memory of the computer should include location information for each of a plurality of nodes in the pre-determined matrix in the bounded flow domain. Preferably, the location information for each node includes: spatial position of the node, velocity vector components, pressure and some measure of turbulence, such as the turbulence kinetic energy and the turbulence dissipation rate.

The preferred approach for determining the flow parameters within the flow domain by direct measurement is to establish a database of the parameters by measuring them throughout the domain a priori (e.g., off-line), under conditions that are similar to those experienced in the process of interest. In the case of a UV disinfection reactor, for example, the velocity, pressure and turbulence parameters could be measured at node locations of a fine three-dimensional grid (i.e., the matrix) within the reactor under flow rates relevant to operating conditions for the reactor. By repeating the measurements for different volume flow rate conditions, a database representative of varying flow conditions can be established. Essentially, the database consists of the x, y, z positions of nodes representing physical measurement locations, and for each different volume flow rate, the relevant flow parameters (velocity, pressure, turbulence intensity . . . ) measured at each node.

The preferred approach for determining the flow parameters within the flow domain by numerical/computation techniques is to use CFD. By modelling the flow within a reactor on a computer, a suitable database comprising the necessary location information can be established.

Whether the database comprising the necessary location information is established experimentally or numerically, it is desirable that it be correlated to the online conditions. This is accomplished by measuring relevant bulk flow parameters. In the case of a UV disinfection reactor, the relevant parameter would most likely be volume flow rate. In the case of an online CFD system, a new database comprising location information could be generated as the volume flow rate changes. On the other hand, if the database comprising the location information was generated offline (using CFD or direct measurement) then interpolation or scaling techniques could be used to closely approximate the online conditions from the conditions available in the database.

Once the flow through the reactor has been determined for the given online conditions, transport equations can be solved to determine relevant process functions (as mentioned above). In the application of the invention to a UV disinfection reactor, the interest lies in reactor performance, or specifically reactor inactivation of target pathogens. Biological inactivation can be modelled as a function of applied UV dose using equations that consider first order kinetics, particle association of microbes, and microbial repair processes.

Under first order kinetics, biological inactivation can be modelled by $$\frac{N}{N_O} = e^{-kD} \quad (1)$$

where $N_O$ is number of viable microbes before disinfection and N is the number of viable microbes after disinfection.

The constant k is dependent on the type of microbe being inactivated and D is the dose delivered. Dose is defined as the germicidal intensity versus exposure time. In a real reactor, the UV intensity will vary with spatial position within the reactor (less UV intensity in regions farther from the lamp) and with the UV Transmittance (UVT) of the water. Since the position of the lamps is known (the geometry of the reactor is known) and the UVT can be measured online, the intensity field within the reactor can be calculated and correlated with online sensor readings. As microbes move through the reactor, due to the motion of fluid (water in this case), they will pass through the intensity field. Clearly the path of a microbe will experience varying degrees of intensity as it moves through the reactor. The integration of the intensity field with the path travelled and UV exposure time will yield a dose value for each microbe.

A UV reactor will have an infinite number of path lines that microbes will track, with each distinct path receiving a distinct dose, $D_i$. Since a reactor will have an infinite number of paths that a microbe could follow, the net reactor inactivation can be written as $$\frac{N}{N_O} = \sum_{i=1}^{\infty} f_i e^{-kD_i} \quad (2)$$

where $f_i$ is the fraction of particles receiving a dose $D_i$, such that $$\sum_{i=1}^{\infty} f_i = 1.$$

Reactor inactivation can be modelled as $$\frac{N}{N_O} = e^{-kD_{eqv}} \quad (3)$$

where $N_O$ is now the flux of viable microbes upstream of the reactor (or the total number of viable microbes in the case of a collimated beam study) and N is the flux of viable microbes downstream of the reactor, after disinfection. $D_{eqv}$ is the dose delivered by the reactor.

The "dose" that the reactor delivers, or the "equivalent dose", can be determined by combining Equations (2) and (3) to give $$\frac{N}{N_O} = e^{-kD_{eqv}} = \sum_{i=1}^{\infty} f_i e^{-kD_i} \quad (4)$$

or $$D_{eqv} = -\frac{1}{k} \ln\left[\sum_{i=1}^{\infty} f_i e^{-kD_i}\right]. \quad (5)$$

Essentially, reactor performance is determined by integrating all of the microbial paths through the reactor. Computationally, this can be determined from the database comprising the location information for each node. Two conventional CFD methods exist which may be used to accomplish this task:

1. Eulerian/scalar approach, and
2. Lagrangian particle tracking approach.

In the Eulerian approach, dose, D, is treated as a scalar, and the equation for scalar transport integrated with the intensity field and the database comprising the location information can be used to determine a dose distribution at the reactor outlet. Integration of the outlet dose distribution with the outlet volume flow rate fraction and Equation (5) will give a reactor performance value based on the target organism inactivation constant, k. The difficulty with the Eulerian approach is that the scalar equations account for diffusion and turbulent mixing which averages out the dose. In reality, each microbe is a discrete entity and should be treated as such and thus should not be averaged. Commercial CFD software can be used to implement the equations quite readily—see, for example the operators manual for Fluent™ CFD software. It should be emphasised that both numerically and experimentally generated database comprising the location information can be used with conventionally CFD software.

The preferred approach is to use Lagrangian particle tracking. With this approach, the database comprising the location information for each node is used to determine the motion of discrete particles through the reactor. The particle path can be integrated with the known intensity field to determine the delivered dose to each particle. Each particle will have its own path and while no two paths will be identical, a sufficient representation of dose distribution can be achieved by calculating the paths of, for example, 100 particles. In this approach, Equations (4) and (5) can be used directly, with the upper limit of the summation set to n, where n is the number of representative particle paths, and $f_i = 1/n$.

In a preferred embodiment of the invention, the database comprises location information for a plurality of particle tracks in at least a portion of the matrix (i.e., instead of location information for a plurality of nodes throughout the matrix). Thus, the database is obtained independently of the intensity field. In other words, instead of storing of the database comprising the location information online, the database can be used to establish a database of particle tracks a priori, and only the particle tracks need to be stored online. This enhancement reduces the computational effort even further.

As indicated hereinabove, a fundamental understanding of a chemical, photochemical or biological process is key to predicting and controlling the outcomes of the process. For example, the present invention can be applied to predicting disinfection performance in a UV radiation fluid treatment system thereby mitigating and/or obviating the above mentioned disadvantages of the prior art. More specifically, a preferred embodiment of the present on-line device is a UV dosimeter used to predict the bioassay equivalent dose in a given UV disinfection system and process.

In this preferred embodiment of the present device, the database comprises of dose data for a plurality of virtual particles passing through a UV disinfection process, where each virtual particle may represent a microbe, a aggregation of microbes and other matter, or a molecule of a chemical. The dose for each virtual particle as it passes through the reactor may be determined by integrating the UV intensity experienced by the particle over the path the particle travels through the UV disinfection process. Mathematically, such a relationship may be expressed as:

$$D_i = \int_{t=0}^{t=t_r} I(x, y, z) dt$$

wherein:

$D_i$ is the UV dose in mJ/cm$^2$ experienced by the $i^{th}$ virtual particle after it has traveled through the UV disinfection process;

I(x,y,z) is the UV intensity in mW/cm² experienced by the particle at position (x,y,z) on its path through the UV disinfection process; and t is the time in seconds where t=0 represents the time the particle enters the UV disinfection process and $t=t_r$ represents the time the particle leaves the UV disinfection process.

The path the virtual particle travels as it passes through the reactor may be determined by "direct measurement" using techniques such as "Laser Doppler Anemometry, Hot Wire Anemometry or Particle Image Velocimetry. Or the path may be predicted using "numerical/computational techniques", typically referred to as Computational Fluid Dynamics (CFD). Those skilled in the art will recognize that CFD techniques allow one to attribute physical characteristics to the virtual particles so as to model the effects of forces like gravity on the virtual particles.

Using these methods, the path of the virtual particles will be typically defined using a space-time coordinate system (x, y, z , t) where x, y and z define a spatial 3-d coordinate system and t represents time. Those skilled in the art will recognize that radial or polar coordinate systems could be used and that symmetry considerations will allow the paths of virtual particles through some UV disinfection processes to be represented by one or two dimensional spatial coordinate systems as opposed to three dimensional systems.

Given that the paths of the virtual particles through the UV disinfection processes will typically be represented using consecutive series of space-time coordinates, the dose delivered to each particle may be written using summation notation as per:

$$D_i = \sum_{j=1}^{j=k_i} \frac{(I(x_{j+1}, y_{j+1}, z_{j+1}) + I(x_j, y_j, z_j))}{2}(t_{j+1} - t_j)$$

Where the path of $i^{th}$ particle through the UV disinfection process is represented by $k_i$ sets of space-time coordinates.

The UV intensity at position (x, y, z) within a UV disinfection processes may be calculated using standard optical techniques using either a radial intensity model as described by:

C. N. Haas and G. P. Sakellaropoulos (1979) "Rational analysis of ultraviolet disinfection", National Conference on Environmental Engineering. Proc. ASCE Specialty Conf., San Francisco, Calif., July 9–11, pp. 540–547;

or by Point Source Summation as described by:

S. M. Jacob and J. S. Dranoff (1970) "Light intensity profiles in a perfectly mixed photoreactor", AICHE Journal, Vol. 16, No. 3, pp. 359–363;

or by Point Source Summation modified to include refraction effects as per:

J. R. Bolton (1999) "Significance of refraction and reflection in the calculation of ultraviolet fluence rate distributions in an annular ultraviolet disinfection reactor using broadband medium-pressure mercury UV lamps".

Those skilled in the art will recognize that a plurality of intensity models may be defined for UV disinfection processes and that each model can offer a reasonable prediction of UV intensity depending on the UV absorbance characteristics of the water being treated and the configuration of the UV reactor. The suitability of the intensity model can be tested using either measurements of UV intensity by radiometer, actinometry, or some other recognized measurements method for UV light.

In the preferred application of the present invention for a UV disinfection process using more than one UV lamp, the dose delivered to the virtual particle by each UV lamp operating at full power is calculated and stored in the database. Accordingly, if the UV disinfection process utilizes "L" UV lamps, for each virtual particle, the database contains the dose delivered to that particle by the $1^{st}$ UV lamp, the $2^{nd}$ UV lamp, and so forth up to the $L^{th}$ V lamp. In one possible manifestation of the database, the information for a 3 lamp reactor may be structured as set out in Table 1.

Those skilled in the art will recognize that the path taken by each virtual particle as it passes through the UV disinfection process will depend on the flowrate and other characteristics of the water. The database may contain dose data for a plurality of flowrates through the disinfection process and a plurality of water characteristics. However, in a preferred application of the invention, only a limited number of flow conditions are stored in the database and dose values for other conditions are obtained by scaling the numbers stored. For example, dose delivered to a virtual particle at flowrate x may be calculated from the dose at flow rate y by multiplying that dose by the ratio of flowrate y to flowrate x.

TABLE 1

| Flowrate (GPM) | UV Transmittance (%) | Lamp ID | Particle ID | Dose (mJ/cm2) |
|---|---|---|---|---|
| 500 | 95 | 1 | 1 | 5 |
| 500 | 95 | 1 | 2 | 6 |
| 500 | 95 | 1 | 3 | 8 |
| 500 | 95 | 1 | 4 | 2 |
| 500 | 95 | 1 | 5 | 4 |
| 500 | 95 | 2 | 1 | 4 |
| 500 | 95 | 2 | 2 | 5 |
| 500 | 95 | 2 | 3 | 7 |
| 500 | 95 | 2 | 4 | 9 |
| 500 | 95 | 2 | 5 | 8 |
| 500 | 95 | 3 | 1 | 8 |
| 500 | 95 | 3 | 2 | 7 |
| 500 | 95 | 3 | 3 | 4 |
| 500 | 95 | 3 | 4 | 4 |
| 500 | 95 | 3 | 5 | 5 |

Those skilled in the art will further recognize that the intensity experienced by each virtual particle as it passes through the UV disinfection process will depend on the UV transmittance of the water being treated. The database may contain dose data for a plurality of UV transmittance values. However, in a preferred application of the invention, the dependence of dose delivered by a given lamp at a given flowrate to each virtual particle as a function of UV transmittance may be modeled using some function and the function coefficients may be stored within the database. For example, the dose delivered to a virtual particle by a given lamp at a given flowrate may be described as a function of UV transmittance ranging from 30 to 99% using a $5^{th}$ order polynomial function. In that case, the database need only contain the five coefficients associated with that polynomial function to describe dose over that UV transmittance range.

Those skilled in the art will further recognize that the UV lamps may be operating at different power levels and that their UV output may vary from Lamp to lamp because of factors such as lamp aging and lamp sleeve fouling. In one manifestation of the current invention, dose delivered to each virtual particle by a given lamp may be scaled by the electrical power setting of that lamp. In another manifestation, dose delivered to each virtual particle may be scaled by the ratio of the UV intensity measured using a calibrated UV sensor to the UV intensity calculated for that sensor using the appropriate UV intensity model or expected from sensor measurements obtained using new lamps, non-fouled lamp sleeves, and non-fouled sensor detection windows.

The net dose experienced by the $i^{th}$ virtual particle as it passes through the UV disinfection process may be calculated by summing the contribution to that particle of each lamp within the reactor. In a preferred manifestation, the net dose per virtual particle may be calculated as per $$(Net\ Dose)_i = \frac{Q_{CFD}}{Q}\sum_{n=1}^{n=L} Dose_{in}(UVT)f_n$$

wherein $Q_{CFD}$ is the flowrate associated with the space-time coordinates of the virtual particle tracks stored in the database;

Q is the actual flowrate passing through the UV disinfection process;

$Dose_{in}(UVT)$ is the dose delivered to virtual particle i by lamp n at a UV transmittance of UVT; and $f_n$ is the scaling factor for lamp n to account for lamp power setting and sensor measurements that indicate fouling or lamp aging.

In order to predict the dose delivery of the UV disinfection process, the dose delivered to a plurality of virtual particles should be calculated. The paths of the particles should start within the inlet piping upstream of the UV disinfection process. The starting location of the virtual particles within the inlet piping should be sufficiently upstream of the reactor that dose delivery to the virtual particles by the UV disinfection process is not significantly affected by moving that location further upstream. In a preferred application of the invention, the starting locations of the virtual particles lie in a plane perpendicular to the bulk flow and are uniformly distributed across that plane. Those skilled in the art will recognize that inlet piping to a UV disinfection process may vary from one installation to the next. Since the configuration of inlet piping will have an impact on the travel of the virtual particles as they pass through the UV disinfection process, an advantage of the present invention is the ability to assess site specific considerations that impact the performance of the UV disinfection process.

In a typical application of the invention, the dose delivery to greater than 250 virtual particles are determined. Those skilled in the art will recognize that no two particles will follow the same path through the UV disinfection process. Accordingly, no two particles will receive exactly the same UV dose. Accordingly, dose delivery to a UV reactor may be presented as a dose histogram. Furthermore, the dose histogram may be modeled using a probability distribution which may be combined with treatment kinetics to predict the net impact of the UV disinfection process.

The net performance of the UV disinfection process may be calculated by summing the impact of the net doses delivered to each of the virtual particles. The impact of dose may be described using kinetic equations determined using standard laboratory practice. In the case of UV disinfection, UV inactivation kinetics for a particular microbe may be determined by exposing a stirred suspension of those microbes to a collimated beam of UV light of known UV intensity. By various exposure times, various doses are applied. The kinetics of inactivation may be obtained by plotting the inactivation achieved as a function of dose delivered. A plot of inactivation as a function of dose may be modeled using first order kinetics $$N/No = exp(-k\ Dose)$$

wherein:

No is the concentration of viable microbes prior to exposure to UV;

N is the concentration of viable microbes after exposure to a UV dose; and k is the first order inactivation constant of the microbes.

Those skilled in the art will recognize that microbial inactivation kinetics do not always follow first order kinetics. In those cases a series-event model, a double exponential model or some other conventional function may be more appropriate for describing the relationship between inactivation and dose.

Given a function g(Dose) describing microbial inactivation kinetics, the net performance of the reactor may be calculated using:

$$\frac{N}{No} = \sum_{i=1}^{i=m} g((Net\ Dose)_i)/m$$

where m is the total number of virtual particles considered to have passed through the UV treatment process.

The net performance of the reactor can be associated with a dose equivalent value using the inactivation kinetics by solving:

$$g(Dose\ Equivalent) = \sum_{i=1}^{i=m} g((Net\ Dose)_i)/m$$

In the case of first order kinetics, these equations could be written as:

$$\frac{N}{No} = \sum_{i=1}^{i=m} exp(k(Net\ Dose)_i)/m$$

and $$Dose\ Equivalent = -\ln\left(\sum_{i=1}^{i=m} exp(k(Net\ Dose)_i)/m\right)\bigg/k.$$

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An on-line device for predicting at least one fluid flow parameter in a process, the process comprising a bounded flow domain having disposed therein a pre-determined matrix, the device comprising a computer having:

(i) a memory for receiving a database, the database comprising location information for a plurality of nodes or particle pathways in the matrix, (ii) means to receive measurement input data from the process, (iii) means to calculate the at least one fluid flow parameter from the database and the input data; and (iv) means to adjust the database in the event that the input data does not correlate to the database.

2. The device defined in claim 1, wherein the database is independently generated and stored in the memory for the at least one predetermined flow state.

3. The device defined in claim 2, wherein the database is independently generated using a Lagrangian-type particle tracking routine.

4. The device defined in claim 2, wherein the database is independently generated using an Eulerian-type scalar convection diffusion routine.

5. The device defined in claim 1, wherein the database is generated on-line by computational fluid dynamics.

6. The device defined in claim 1, wherein the matrix comprises a one-dimensional array of nodes.

7. The device defined in claim 1, wherein the matrix comprises a two-dimensional array of nodes.

8. The device defined in claim 1, wherein the matrix comprises a three-dimensional array of nodes.

9. The device defined in claim 1, wherein the process comprises a radiation fluid treatment process.

10. The device defined in claim 9, wherein the at least one fluid flow parameter comprises radiation dose.

11. The device defined in claim 1, wherein the process comprises a chemical process.

12. The device defined in claim 11, wherein the at least one fluid flow parameter comprises concentration of at least one chemical in the process.

13. The device defined in claim 1, wherein the process comprises a biological process.

14. The device defined in claim 13, wherein the at least one fluid flow parameter comprises viability of one organism in the biological process.

15. The device defined in claim 1, wherein the bounded flow domain comprises an open reactor in which the process is conducted.

16. The device defined in claim 15, wherein the open reactor comprises a channel though which a fluid flows.

17. The device defined in claim 1, wherein the bounded flow domain comprises a closed reactor in which the process is conducted.

18. The device defined in claim 17, wherein the closed reactor comprises a channel though which a fluid is contained.

19. The device defined in claim 1, further comprising means to signify calculation of the at least one fluid flow parameter.

20. The device defined in claim 19, wherein the means to signify comprises a visible indicator.

21. The device defined in claim 19, wherein the visible indicator comprises a display.

22. The device defined in claim 19, wherein the visible indicator comprises a colored indicator.

23. The device defined in claim 19, wherein the means to signify comprises an audible indicator.

24. The device defined in claim 19, wherein the means to signify comprises a visible indicator and an audible indicator.

25. The device defined in claim 1, further comprising means to control the process in consequence to calculation of the at least one fluid flow parameter.

26. The device defined in claim 25, wherein the means to control comprises means to compare calculation of the at least one fluid flow parameter with a predetermined threshold value for the at least one fluid flow parameter.

27. The device defined in claim 1, wherein the means to receive input data from the process comprises a keyboard.

28. The device defined in claim 1, wherein the means to receive input data from the process comprises an electronic controller.

29. The device defined in claim 1, wherein the computer is located in a first location and the process is located in a second location remote with respect to the first location.

30. The device defined in claim 29, wherein the computer further comprises a telecommunications link to permit communication between the first location and the second location.

31. An on-line device for predicting at least one fluid flow parameter in a process, the process comprising a flow domain having disposed therein a pre-determined portion in which a fluid flows, the device comprising a computer having:

(i) a memory for receiving a database, the database comprising relative information in respect of a plurality of nodes or a plurality of particle pathways in the pre-determined portion;

(ii) means to receive measurement input data from the process, (iii) means to calculate the at least one fluid flow parameter from the database and the input data; and (iv) means to adjust the database in the event that the input data does not correlate to the database.

32. The device defined in claim 31, wherein the database is independently generated and stored in the memory for the at least one predetermined flow state.

33. The device defined in claim 32, wherein the database is independently generated using a Lagrangian-type particle tracking routine.

34. The device defined in claim 32, wherein the database is independently generated using an Eulerian-type scalar convection diffusion routine.

35. The device defined in claim 31, wherein the database is generated on-line by computational fluid dynamics.

36. The device defined in claim 31, wherein the pre-determined portion comprises a one-dimensional array of nodes.

37. The device defined in claim 31, wherein the pre-determined portion comprises a two-dimensional array of nodes.

38. The device defined in claim 31, wherein the pre-determined portion comprises a three-dimensional array of nodes.

39. The device defined in claim 31, wherein the process comprises a radiation fluid treatment process.

40. The device defined in claim 39, wherein the at least one fluid flow parameter comprises radiation dose.

41. The device defined in claim 31, wherein the process comprises a chemical process.

42. The device defined in claim 41, wherein the at least one fluid flow parameter comprises concentration of at least one chemical in the process.

43. The device defined in claim 31, wherein the process comprises a biological process.

44. The device defined in claim 43, wherein the at least one fluid flow parameter comprises viability of one organism in the biological process.

45. The device defined in claim 31, wherein the pre-determined portion is comprised in a bounded flow domain.

46. The device defined in claim 45, wherein the bounded flow domain comprises an open reactor in which the process is conducted.

47. The device defined in claim 46, wherein the open reactor comprises a cannel though which a fluid flows.

48. The device defined in claim 45, wherein the bounded flow domain comprises a closed reactor in which the process is conducted.

49. The device defined in claim 48, wherein the closed reactor comprises a channel through which a fluid is contained.

50. The device defined in claim 31, further comprising means to signify calculation of the at least one fluid flow parameter.

51. The device defined in claim 50, wherein the means to signify comprises a visible indicator.

52. The device defined in claim 50, wherein the visible indicator comprises a display.

53. The device defined in claim 50, wherein the visible indicator comprises a colored indicator.

54. The device defined in claim 50, wherein the means to signify comprises an audible indicator.

55. The device defined in claim 50, wherein the means to signify comprises a visible indicator and an audible indicator.

56. The device defined in claim 31, further comprising means to control the process in consequence to calculation of the at least one fluid flow parameter.

57. The device defined in claim 56, wherein the means to control comprises means to compare calculation of the at least one fluid flow parameter with a pre-determined threshold value for the at least one fluid flow parameter.

58. The device defined in claim 31, wherein the means to receive input data from the process comprises a keyboard.

59. The device defined in claim 31, wherein the means to receive input data from the process comprises an electronic controller.

60. The device defined in claim 31, wherein the computer is located in a first location and the process is located in a second location remote with respect to the first location.

61. The device defined in claim 60, wherein the computer further comprises a telecommunications link to permit communication between the first location and the second location.

62. An on-line UV dosimeter device for predicting bioassay equivalent dose for a given microorganism in a UV disinfection process, the UV disinfection process comprising a flow domain in which a fluid flows, the device comprising a computer having:

(i) a memory for receiving a database, the database comprising relative dose information in respect of a plurality of fluid pathways through the flow domain;

(ii) means to receive input data from the process, the input data selected from the group comprising uv transmittance of the fluid, flow rate of the fluid and intensity field in the fluid domain;

(iii) means to calculate the bioassay equivalent dose for the given microorganism from the database and the input data; and (iv) means to adjust the database in the event that the input data does not correlate to the database.

63. The device defined in claim 62, wherein the database is independently generated and stored in the memory for the at least one predetermined flow state.

64. The device defined in claim 63, wherein the database is independently generated using a Lagrangian-type particle tracking routine.

65. The device defined in claim 63, wherein the database is independently generated using an Eulerian-type scalar convection diffusion routine.

66. The device defined in claim 62, wherein the database is generated on-line by computational fluid dynamics.

67. The device defined in claim 62, wherein the pre-determined portion comprises a one-dimensional array of nodes.

68. The device defined in claim 62, wherein the pre-determined portion comprises a two-dimensional array of nodes.

69. The device defined in claim 62, wherein the pre-determined portion comprises a three-dimensional array of nodes.

70. The device defined in claim 62, wherein the pre-determined portion is comprised in a bounded flow domain.

71. The device defined in claim 70, wherein the bounded flow domain comprises an open reactor in which the process is conducted.

72. The device defined in claim 71, wherein the open reactor comprises a channel though which a fluid flows.

73. The device defined in claim 70, wherein the bounded flow domain comprises a closed reactor in which the process is conducted.

74. The device defined in claim 73, wherein the closed reactor comprises a channel though which a fluid is contained.

75. The device defined in claim 62, further comprising means to signify calculation of the bioassay equivalent dose.

76. The device defined in claim 75, wherein the means to signify comprises a visible indicator.

77. The device defined in claim 76, wherein the visible indicator comprises a display.

78. The device defined in claim 76, wherein the visible indicator comprises a colored indicator.

79. The device defined in claim 75, wherein the means to signify comprises an audible indicator.

80. The device defined in claim 75, wherein the means to signify comprises a visible indicator and an audible indicator.

81. The device defined in claim 62, further comprising means to control the process in consequence to calculation of the bioassay equivalent dose.

82. The device defined in claim 81, wherein the means to control comprises means to compare calculation of the bioassay equivalent dose with a pre-determined threshold value for the bioassay equivalent dose.

83. The device defined in claim 62, wherein the means to receive input data from the process comprises a keyboard.

84. The device defined in claim 62, wherein the means to receive input data from the process comprises an electronic controller.

85. The device defined in claim 62, wherein the computer is located in a first location and the process is located in a second location remote with respect to the first location.

86. The device defined in claim 85, wherein the computer further comprises a telecommunications link to permit communication between the first location and the second location.

87. A method for on-line prediction of at least one fluid flow parameter in a process, the process comprising a flow domain having disposed therein a pre-determined portion in which a fluid flows, the method comprising the steps of:

(i) storing in a memory of a computer a database, the database comprising relative information in respect of a plurality of nodes or a plurality of particle pathways in the pre-determined portion;

(ii) obtaining measurement input data from the process;

(iii) conveying the input data to the computer (iv) adjusting the database in the event that the input data does not correlate to the database; and (v) calculating the at least one fluid flow parameter from the database and the input data.

* * * * *

UNITED STATES PATENT AND TRADEMARK OFFICE
CERTIFICATE OF CORRECTION

| | | |
|---|---|---|
| PATENT NO. | : 6,564,157 B2 | Page 1 of 1 |
| APPLICATION NO. | : 09/729921 | |
| DATED | : May 13, 2003 | |
| INVENTOR(S) | : Yuri Lawryshyn et al. | |

It is certified that error appears in the above-identified patent and that said Letters Patent is hereby corrected as shown below:

On title page Item (75)
Please add the names – Yuri Lawryshyn, David A. Olson, and Harold Wright as listed inventors.

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,564,157 B2  Page 1 of 1
APPLICATION NO. : 09/729921
DATED : May 13, 2003
INVENTOR(S) : Yuri Lawryshyn et al.

It is certified that error appears in the above-identified patent and that said Letters Patent is hereby corrected as shown below:

On title page
Item (12) should read --Lawryshyn et al--.

Item (75) Please correct the order of the names of inventors to read --Yuri Lawryshyn, David A. Olson, and Harold Wright--

This certificate supersedes the Certificate of Correction issued November 27, 2007.

Signed and Sealed this

Fifteenth Day of April, 2008

JON W. DUDAS
*Director of the United States Patent and Trademark Office*